United States Patent [19]
Lewis et al.

[11] Patent Number: 5,275,836
[45] Date of Patent: Jan. 4, 1994

[54] PROCESS FOR TREATING BROWN RICE AND PRODUCT THEREOF

[75] Inventors: Victor M. Lewis; David A. Lewis, both of Sydney, Australia

[73] Assignee: Byron Agricultural Companmy Pty. Ltd., Australia

[21] Appl. No.: 27,361

[22] Filed: Mar. 8, 1993

[30] Foreign Application Priority Data

Apr. 10, 1992 [AU] Australia ............................ PL1855

[51] Int. Cl.⁵ .............................................. A23L 1/182
[52] U.S. Cl. ...................................... 426/627; 426/449; 426/455; 426/459; 426/479; 426/482; 426/483; 426/484
[58] Field of Search ............... 426/627, 449, 455, 459, 426/479, 482, 483, 484

[56] References Cited

U.S. PATENT DOCUMENTS

| | | | |
|---|---|---|---|
| 1,364,912 | 1/1921 | Baumgartner | 426/627 |
| 2,740,719 | 4/1956 | Ozai-Durrani | 426/627 |
| 4,361,593 | 11/1982 | Brooks et al. | 426/627 |

Primary Examiner—Helen F. Pratt
Attorney, Agent, or Firm—Scully, Scott, Murphy & Presser

[57] ABSTRACT

A rice product prepared from brown rise grains by
milling brown rice grains to remove a controlled proportion of the bran layer therefrom whereby from 2% to 10%, of the total weight of the rice grains is removed;
hydrating the grains to increase their moisture content to between 20-40%, preferably 25-35%;
cooking the grains to gelatinize the starch therein;
removing moisture from at least the outer layers of the grains;
milling the grains to remove the residual bran layer and germ therefrom.

20 Claims, No Drawings

PROCESS FOR TREATING BROWN RICE AND PRODUCT THEREOF

BACKGROUND OF THE INVENTION

Much of the world's rice harvest is converted into parboiled rice. The process involves the hydration, gelatinization and drying of the rice paddy before carrying out the actual milling process. Typically, rice, in the paddy form, is steeped in water to increase its moisture content, then the steeped rice is cooked to gelatinize substantially the starch in the rice endosperm. The fully cooked paddy is dried, then the grain is milled. The reason for parboiling rice is to achieve higher percentage of whole grains after milling, higher content of B vitamins and also to reduce the susceptibility of the parboiled grain to insect attack in storage. Much detail is involved in parboiling, and this is described in the literature. Reviews of the technology are found in "Rice: Chemistry and Technology" edited by B. O. Juliano, American Association of Cereal Chemists Inc., St. Paul MN, 1985., and in "Rice: Production and Utilisation" edited by B. S. Luh, AVI Publishing Company, Inc., Westport CN, 1980.

PRIOR ART LITERATURE

The above mentioned review texts describe a range of variations to the basic parboiling process. All of the processes described indicate that rough rice (paddy) is the form of rice which is chosen to be parboiled and indicate that difficulties arise if brown rice is used.

Gariboldi has described ways of producing light colored parboiled rice by use of added chemicals (Riso 22 (4) 353-360 (1973) such as sodium bisulphite or sulphur dioxide in the soaking water or potassium permanganate in the soak, followed by washing or bleaching. Such use of chemicals has a number of negative aspects, especially that of consumer attitude to use of chemicals in basic food products Pillaryar (Malaysian Agricultural Journal 53 (2) 97-105 (1981) describes how the color of parboiled rice is influenced by factors such as soaking temperature, parboiling temperature and degree of gelatinization. Vellapulai and Verma (Transactions of the American Society of Agricultural Engineers (1982) 1450-1456) also studied the effects of moisture levels and moisture equilibration in the soaked rough rice on grain qualities including color of the final parboiled rice, which they showed to be related to the moisture level achieved at soaking and/or the pH conditions in the soaking water. The parboiled rices they produced were all darker than untreated creamy white rice.

Juliano (see above) refers to the difference in grain shapes after cooking between untreated rice and parboiled rice, the former producing long slender grains, and latter producing more stocky-shaped grains. Thus, a parboiled rice which cooked to the shape of untreated natural rice would be seen to be more appealing, especially to consumers who are used to cooking untreated rice.

While parboiled rice represents an important part of the world rice industry, there are in the eyes of the consumer certain negative aspects to parboiled rice. These include:

Colour: parboiled rice is at best off-white and more typically a light straw to brown colour, very different from the bright creamy white colour of cooked white rice which has not been parboiled Flavour: parboiled rice has a heavily cooked and branny flavour, whereas white rice has a delicate natural rice aroma and flavour Shape of cooked grains: parboiled long grain rice when cooked expands more in thickness and less in length than does white rice, so the long slender natural white rice shape of the cooked grain is not duplicated by parboiled rice. This is especially apparent with long grain types of rice.

Parboiled rice has a content of B-vitamins much higher than white rice but this factor is of concern only to consumers whose diet is predominantly based on rice.

Parboiled rice is processed typically by starting with rice paddy, also called rough rice Rough rice is rice with the rice hull still present. Inside the rice hull is the rice grain which, of course, has its bran layer and the germ intact. The rough rice is steeped in water at an elevated temperature so that the rice grain can become fully hydrated. Sometimes the rough rice is first subjected to vacuum in the steep vessels, the vacuum being released by the entry of hot steep water. This facilitates removal of air from the space between the hull and the grain and also enhances the speed of wetting of the rough rice. The steeped rough rice is then steamed, within the steep vessel, in a different vessel or in a continuous pressure cooker. Modern parboiling can comprise continuous pressure steaming for a time and temperature selected to give the degree of gelatinization required for the chosen finished product grade. After this cooking process, by whatever method, the now parboiled rough rice is carefully dried to about 14% moisture content so as to produce grains which have no readily visible cracks. The dry rough rice is then subjected to more-or-less conventional milling which comprises first hull removal then bran and germ removal to produce smooth hard translucent grains typically of light brown or straw colour.

According to the literature it is possible to produce parboiled rice by using brown rice as the starting material, rather than rough rice This has the advantage of absorbing water during processing very much faster than rough rice, but it is necessary to prevent the rice from caking or clumping after steaming and to prevent cracking during drying. (See page 340 of the Juliano text cited).

The present invention has as its object a form of parboiled rice which has a natural white rice flavor with no branny or heavily cooked flavor.

A further object is a form of parboiled rice which is much whiter in colour than the best available parboiled rice and is essentially as white as natural cooked white rice.

A still further object is a form of parboiled rice which has the long slender shape of high quality natural long grain white rice when cooked rather than the thicker and shorter grains of existing types of parboiled rice.

A further object of the invention is a form of parboiled rice which has an aroma when freshly cooked which resembles natural non-parboiled cooked rice aroma and which lacks the typical branny parboiled aroma which is characteristic of traditional parboiled rice.

Other advantages of this form of parboiled rice will be apparent from the following descriptions. These desirable characteristics of parboiled rice which are the object of this invention are derived by certain critical changes to the steps of parboiling resulting in a process which is quite unconventional.

SUMMARY OF THE INVENTION

The invention relates to a Process of preparing a rice product which comprises the steps of:
a. milling brown rice grains to remove a controlled proportion of the bran layer therefrom whereby from 2% to 10% of the total weight of the rice grains is removed;
b. hydrating the grains to increase their moisture content to between 20–40%, preferably 25–35%;
c. cooking the grains to gelatinize the starch therein;
d. removing moisture from at least the outer layers of the grains;
e. milling the grains to remove the residual bran layer and germ therefrom.

Preferably loose bran and free starch is removed from the surface of the grains prior to step (b) preferably by washing, rinsing or brushing and preferably any free surface moisture is removed from the grains prior to step (c) and further moisture is removed from the grains as may be required following step (e).

The invention also relates to a parboiled rice product produced by such process.

In accordance with a preferred form the invention utilizes brown rice which has been partially and uniformly debranned by means of normal rice milling equipment. The removal of bran may vary from about 2% to 10% but is preferably about 4% to 7%. The percentage refers to the loss of weight from the brown rice as a consequence of the debranning operation. Partial debranning is carried out so that sufficient bran layer remains to ensure the rice is not unduly cohesive after cooking. Removal of bran from the grains of rice should be carried out uniformly so that residual bran remains adhering to the grains as evenly as possible over the surface of the grains. However the quantity of bran layer remaining is such that during hydration and cooking, the development of branny flavour and of the straw or light brown colour in the finished product is substantially reduced because of the total absence of hull and the absence of a significant proportion of the bran, especially the outer bran. Following debranning, the rice is subjected to a brief washing or rinsing to remove loose bran and free starch from the surface of the grains. As an alternative to washing or rinsing, the partly debranned rice may be brushed and aspirated using readily available equipment to remove loose bran and starch from the grain surface.

The partly debranned rice is then ready for hydration. It should be noted that the volume occupied by paddy is much greater than that of partially debranned rice kernels derived therefrom. Hence the vessel size or space is reduced when processing partially debranned rice. This represents a useful economy in processing. Hydration of the partly debranned rice may be carried out by any suitable method as normally used in the parboiled rice industry. The rice may be steeped either on a batch basis or on a continuous basis in water for example at above 60° C., until a moisture content of about 28-33% is achieved.

Because the hull and a proportion of the bran has been removed the rate of moisture absorption is quicker than with conventional rice paddy. Hence the steep period if carried out at 60° C. maybe for 20 to 60 minutes, typically 23 to 50 minutes, depending on the variety of rice and on other factors. While steeping at 60° C. is found very suitable, steeping at higher and lower temperatures is also satisfactory. Because the steep period is of such short duration it is practicable for the steep process to be effected on a continuous basis, or on a continuous batch basis. By contrast, the literature describes the steeping process as occupying many hours which makes continuous steeping impracticable. Furthermore, the number and size of steeping vessels may be greatly reduced when steeping is carried out for say 30 minutes as compared to several hours, and this represents an important economy.

The steeped grain is drained of any surface liquid and then passes to equipment for cooking and gelatinizing the grains. This is typically carried out using live steam, but other methods of heat transfer are also suitable. Using live steam, the Preferred method is by use of continuous pressure steaming equipment. Any other suitable equipment such as batch-type rotary pressure steamers may also be used. The temperature and duration of steaming may be varied depending on the type of rice being processed and the character of parboiled rice being produced and its intended use. Typically the rice may be steamed at about 120° C. for 5 to 15 minutes, but both shorter and longer periods of steaming at higher and lower temperatures can be satisfactory. The selection of an appropriate combination of time and temperature can be achieved by a person skilled in the operation of the equipment used for the purpose and in the preparation of quality parboiled rice.

When the hot gelatinized rice exits from the gelatinizing equipment, for example from the batch rotary cooker or from the continuous pressure cooker, it is quite free-flowing and separate It is then transferred directly to pre-drying/cooling equipment so the moisture is removed Promptly from the outer layers of each grain of rice and the temperature is rapidly lowered. A variety of equipment may be used for this purpose. A continuous belt type of dehydration unit is very suitable with warm or hot air passing up through the perforated belt and the bed of rice. Alternately down-draft air movement is also satisfactory. After pre-drying the rice so that the surface moisture is reduced, the rice may be further dried in any type of equipment as used in parboiled rice drying. Rapid pre-drying of the rice also results in cooling of the rice from the temperature at which the rice has been cooked which is beneficial to the quality of the final product. Of course pre-drying may be part of a single continuous drying process. The separate pre-drying is described to emphasize the desirability of rapid cooling of the rice after rice has been cooked and gelatinized.

Since there remains a small amount of the bran layer and germ on the rice, it is necessary to carry out a final milling to remove this residual bran and germ. This may be carried out using conventional parboiled rice milling equipment and procedures.

For certain food manufacturing processes utilizing parboiled rice there can be advantages in passing parboiled rice from the parboiling operation to the further process steps at an elevated moisture content. It has been found, surprisingly, that parboiled rice, processed as herein described, can be successfully milled immediately after the drying operation (which follows the gelatinization of the rice) when the moisture content of the rice is in the region of 18 to 26%, typically 22 to 24%. As long as the mill is equipped with good forced air aspiration/ventilation, the final vestiges of bran and germ can be very effectively milled from the rice grains, leaving a very light coloured parboiled rice. By carrying out the final milling at an elevated moisture content the amount of grain breakage is very minimal.

As already described the rice may be dried directly to the more conventional 12-14% moisture content for final milling. It has been found that the partial bran removal described above can be effected with little or no increase in the percentage of broken grains. (By contrast, total whitening of non-parboiled rice will always cause a significant percentage of grain breakage such that the broken grains must be removed and sold separately at a lower price). It has further been found that there is little or no increase in the percentage of broken grains during steeping, draining, cooking, drying and final bran removal. Thus, starting with a particular grade of brown rice as raw material, it is possible to produce a finished product in which there is little or no increase in the percentage of broken grains over and above the percentage present in the starting raw material. This represents an important economy since as stated broken rice sells at a much lower price than whole grain rice.

EXAMPLE

High-amylose long grain brown rice was partially and evenly peeled in an abrasive rice whitening machine (Milling Machine) of the horizontal Satake type such that the loss of weight due to bran and germ removal was 6%. The partly debranned rice was then rinsed for 2 minutes in a shower of water to remove loose bran and surface starch, and then immersed in water such that the temperature of the rice and water was 60° C. The rice was steeped at this temperature for about 45 minutes, then removed from the water and drained. The moisture content was 29-30%. The steeped rice was heated in live steam under pressure at a temperature of 121° C. for 12 minutes. The cooked rice was transferred to a dehydrator in which the moisture content was rapidly reduced to 24%. The rice was quite separate. Part of the rice was treated in the same type of abrasive rice whitener and the residual bran and germ was readily removed, to yield a very light coloured parboiled rice sample. This rice was found suitable for use in certain applications in which parboiled rice at an elevated moisture content was required. Being at an elevated moisture content it is necessary for the rice to be used directly since its storage life is limited.

The other part of the rice was further dried carefully to a moisture content of 12% and was then treated in rice whitening equipment to remove the residual bran and germ remaining. The final product was very light in color. When cooked in water by total absorption, the cooked rice was white in color and had a natural (unprocessed) aroma and flavour. The grains had a long slender appearance, resembling natural rice when cooked, and were quite separate, fluffy and non-cohesive.

The above cooked rice was compared with parboiled rice of the same variety which had been parboiled by the conventional method of steeping the paddy (rough rice). Rice samples prepared according to this example were measured for individual cooked grain length and thickness and the ratio length: thickness was calculated and averaged. Conventional parboiled rice of the same variety was cooked in identical manner and measured in the same way. Results follow.

| Using Rice of the Same Variety - Compared After Cooking | | |
|---|---|---|
| Characteristic | Conventional Parboiled Rice | Rice of this Invention |
| Color | Light brown or straw color | Creamy white natural rice color. |
| Flavor | Branny-typical pre-cooked or parboiled flavor | Fresh white rice flavor |
| Aroma | Branny, parboiled aroma | Natural white rice aroma |
| Appearance | Thick, blocky grains | Slender natural grains |
| Grain dimensions (average ratio of length:thickness) | 3.5 | 4.9 |
| Separateness | Cooked grains quite separate | Cooked grains quite separate |

Types of rice other than long grain rice may be processed in a similar way though it will be understood by a skilled person that details of the process with respect to steep times and temperatures, cook times and temperatures and the like may be varied to suit the type of rice and the final desired product without departing from the principle of the invention.

We claim:
1. A process of preparing a rice product from brown rice grains which comprises the following sequential steps
    (a) milling brown rice grains to remove a controlled proportion of the bran layer therefrom whereby from 2% to 10% of the total weight of the rice grains is removed;
    (b) hydrating the grains to increase their moisture content to between 20-40%;
    (c) cooking the grains to gelatinize the starch therein;
    (d) removing moisture from at least the outer layers of the grains;
    (e) milling the grains to remove the residual bran layer and germ therefrom.
2. A process as claimed in claim 1 wherein following step (e) the grains are dried.
3. A process as claimed in claim 1 wherein in step (a) 4 to 7% of the total weight of the rice is removed.
4. A process as claimed in claim 1 wherein loose bran and free starch is removed from the surface of the grains prior to step (b).
5. A process as claimed in claim 4 wherein the loose bran and free starch is removed from the surface of the grains by washing, rinsing or brushing.
6. A process as claimed in claim 1 wherein in step (b) the moisture content of the grains is increased by steeping at a temperature of about 60° C. for 20-60 minutes to increase the moisture content of the grains to 28-33%.
7. A process as claimed in claim 1 wherein any free surface moisture is removed from the grains prior to step (c).
8. A process as claimed in claim 1 wherein in step (c) the grains are cooked by steaming at a temperature of about 120° C. for 5-15 minutes.
9. A process as claimed in claim 1 wherein prior to step (e) the moisture content of the grains is between 12-26%.
10. A process as claimed in claim 1 wherein prior to step (e) the moisture content of the grains is 12-14%.
11. A rice product prepared from brown rice grains in accordance with the following sequential steps

(a) milling brown rice grains to remove a controlled proportion of the bran layer therefrom whereby from 2% to 10% of the total weight of the rice grain has been removed;

(b) hydrating the grains to increase their moisture content to between 20-40%;

(c) cooking the grains to gelatinize the starch therein;

(d) removing moisture from at least the outer layers of the grains;

(e) milling the grains to remove the residual bran layer and germ therefrom.

12. A rice product as claimed in claim 11 wherein following step (e) the grains are dried.

13. A rice product as claimed in claim 11 wherein in step (a) 4 to 7% of the total weight of the rice is removed.

14. A rice product as claimed in claim 11 wherein loose bran and free starch is removed from the surface of the grains prior to step (b).

15. A rice product as claimed in claim 14 wherein the loose bran and free starch is removed from the surface of the grains by washing, rinsing or brushing.

16. A rice product as claimed in claim 11 wherein in step (b) the moisture content of the grains is increased by steeping at a temperature of about 60° C. for 20-60 minutes to increase the moisture content of the grains to 28-33%.

17. A rice product as claimed in claim 1 wherein any free surface moisture is removed from the grains prior to step (c).

18. A rice product as claimed in claim 11 wherein in step (c) the grains are cooked by steaming at a temperature of about 120° C. for 5-15 minutes.

19. A rice product as claimed in claim 11 wherein prior to step (e) the moisture content of the grains is between 12%-26%.

20. A rice product as claimed in claim 11 wherein prior to step (e) the moisture content of the grains is 12-14%.

* * * * *

UNITED STATES PATENT AND TRADEMARK OFFICE
CERTIFICATE OF CORRECTION

PATENT NO. : 5,275,836
DATED : January 4, 1994
INVENTOR(S) : Victor M. Lewis

It is certified that error appears in the above-indentified patent and that said Letters Patent is hereby corrected as shown below:

On the Title Page, item: [73]: "Companmy" should read --Company--

Column 1, line 40: after "products" insert --.--
Column 1, line 41: "53" should read --53--
Column 2, line 17: after "rough rice" insert --.--
Column 2, line 43: after "rough rice" insert --.--
Column 3, line 6: "Process" should read --process--

UNITED STATES PATENT AND TRADEMARK OFFICE
CERTIFICATE OF CORRECTION

PATENT NO. : 5,275,836
DATED     : January 4, 1994
INVENTOR(S) : Victor M. Lewis It is certified that error appears in the above-indentified patent and that said Letters Patent is hereby corrected as shown below:

Column 4, line 17: "Preferred" should read --preferred--

Column 4, line 34: after "separate" insert --.--

Column 4, line 36: "Promptly" should read --promptly--

Signed and Sealed this

Third Day of January, 1995

Attest:

BRUCE LEHMAN

Attesting Officer

Commissioner of Patents and Trademarks